United States Patent
Stewart et al.

(10) Patent No.: US 7,767,305 B1
(45) Date of Patent: Aug. 3, 2010

(54) HIGH EFFICIENCY TANTALUM-BASED CERAMIC COMPOSITE STRUCTURES

(75) Inventors: David A. Stewart, Santa Cruz, CA (US); Daniel B. Leiser, San Jose, CA (US); Robert R. DiFiore, Fremont, CA (US); Victor W. Katvala, San Jose, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 0 days.

(21) Appl. No.: 10/758,611

(22) Filed: Jan. 14, 2004

(51) Int. Cl.
- *B32B 7/02* (2006.01)
- *B32B 27/32* (2006.01)
- *B32B 17/06* (2006.01)
- *B32B 9/00* (2006.01)

(52) U.S. Cl. ........................ 428/428; 428/408; 428/426; 428/446; 428/704

(58) Field of Classification Search ................. 428/426, 428/428, 432, 446, 688, 689, 212, 220, 408, 428/704; 501/11, 21, 94
See application file for complete search history.

(56) References Cited

U.S. PATENT DOCUMENTS

| | | | |
|---|---|---|---|
| 2,992,959 A | 7/1961 | Schrewlius | |
| 4,039,997 A | 8/1977 | Huang et al. | |
| 4,093,771 A * | 6/1978 | Goldstein et al. | 428/312.6 |
| 4,308,309 A | 12/1981 | Leiser et al. | |
| 4,381,333 A | 4/1983 | Beggs et al. | |
| 5,079,082 A | 1/1992 | Leiser et al. | |
| 5,296,288 A | 3/1994 | Kourtides et al. | |
| 5,308,806 A | 5/1994 | Maloney et al. | |
| 5,429,997 A | 7/1995 | Hebsur | |
| 5,677,060 A | 10/1997 | Terentieva et al. | |
| 5,880,439 A | 3/1999 | Deevi et al. | |
| 5,945,166 A | 8/1999 | Singh et al. | |
| 6,225,248 B1 | 5/2001 | Leiser et al. | |
| 6,444,271 B2 * | 9/2002 | Wittenauer et al. | 427/376.2 |
| 6,749,942 B1 * | 6/2004 | Wittenauer et al. | 428/446 |
| 6,955,853 B1 | 10/2005 | Tran et al. | |
| 2001/0051218 A1 * | 12/2001 | Wittenauer et al. | 427/376.2 |

OTHER PUBLICATIONS

Internet website http://www.azom.com.*
Internet website http://www.micrometals.com/tantalum_silicide.htm.*

(Continued)

*Primary Examiner*—Timothy M Speer
*Assistant Examiner*—Jonathan C Langman
(74) *Attorney, Agent, or Firm*—John F. Schipper; Robert M. Padilla (57) ABSTRACT

Tantalum-based ceramics are suitable for use in thermal protection systems. These composite structures have high efficiency surfaces (low catalytic efficiency and high emittance), thereby reducing heat flux to a spacecraft during planetary re-entry. These ceramics contain tantalum disilicide, molybdenum disilicide and borosilicate glass. The components are milled, along with a processing aid, then applied to a surface of a porous substrate, such as a fibrous silica or carbon substrate. Following application, the coating is then sintered on the substrate. The composite structure is substantially impervious to hot gas penetration and capable of surviving high heat fluxes at temperatures approaching 3000° F. and above.

6 Claims, 9 Drawing Sheets

OTHER PUBLICATIONS

Office Action, dated Dec. 4, 2007, from a continuation-in-part, U.S. Appl. No. 10/956,516, filed Sep. 28, 2004.
Office Action, dated Aug. 19, 2008, from a continuation-in-part, U.S. Appl. No. 10/956,516, filed Sep. 28, 2004.
Nextel 312 Woven Fabrics, Foundry Service & Supplies, Inc., 1-3.
First Office Action (mailed Apr. 6, 2009) in a CIP Application, U.S. Appl. No. 11/416,508, NASA, filed Apr. 14, 2006, 25 pages.
Response to Nonfinal Action, mailed Dec. 4, 2007, Response filed May 5, 2008, in a CIP Application, U.S. Appl. No. 10/956,516, NASA, filed Sep. 28, 2004.
Response to Nonfinal Action, mailed Apr. 6, 2009, Response filed Oct. 6, 2009, in a CIP Application, U.S. Appl. No. 11/416,508, NASA, filed Apr. 14, 2006.
Final Rejection, mailed Nov. 6, 2009, in a CIP Application, U.S. Appl. No. 11/416,508, NASA, filed Apr. 14, 2006.

* cited by examiner

HIGH EFFICIENCY TANTALUM-BASED CERAMIC COMPOSITE STRUCTURES

ORIGIN OF INVENTION

The invention described herein was made by employees of the United States Government and may be manufactured and used by or for the Government for governmental purposes without payment of any royalties thereon or therefore.

TECHNICAL FIELD OF THE INVENTION

The present invention relates generally to thermal protection systems and in particular to composite structures containing tantalum-based ceramics.

BACKGROUND OF THE INVENTION

Previous composite insulating structures intended for use in such applications as on orbital reentry vehicles, such as the Space Shuttle Orbiter, have consisted of a coating in combination with a low density insulation substrate. A borosilicate glass, Reaction Cured Glass (RCG), was chosen as the coating for the silica type of Reusable Surface Insulation (RSI) previously selected as the heat shield for the Orbiter, as disclosed in U.S. Pat. No. 4,093,771 issued Jun. 6, 1978 to Goldstein et al. This coating was prepared by blending an emittance agent, silicon tetraboride, with a specially prepared borosilicate glass powder, composed of approximately 94% by weight silica and 6% by weight boron oxide, and an ethanol carrier in a ball mill. The resulting slurry was optimized to limit penetration of the slurry into the low density insulation and limit sagging during the subsequent sintering operation. After drying, the coating was sintered (fused) to a "theoretical" density of 2.2 g/cc at 1220° C. (2225° F.). The "as fired" RCG coating weighs 0.07 g/sq cm (0.15 lbs/sq ft) and is approximately 0.3 mm (0.013 in) thick and has been applied to advanced insulation systems.

Current passive systems being proposed for use as leading edge thermal protection systems on future vehicles include hot structure, heat sink, and transpiration cooled technologies. Hot structures such as reinforced carbon-carbon are being used on the Orbiter, e.g., on the wing leading edge and nose cap, and silicon carbide systems have been proposed for other reentry vehicles such as the X-33 and X-38, etc.

The systems used on the Orbiter for the wing leading edge and nose cap typically operate at temperatures below 2700° F. (1480° C.) during Earth entry. This system, if breached, has resulted in the loss of the vehicle during Earth entry. Also, these systems are heavier, orders-of-magnitude more expensive, and require much longer lead times for delivery than a system made using rigid fibrous insulation. Other lighter weight, less expensive alternatives including coated fibrous insulation systems (such as RCG on LI-900, a low-density fibrous silica glass structure) are susceptible to excessive surface recession and/or impact damage during launch and/or landing.

The impact resistance of the fibrous insulation systems was substantially improved by the development of the Toughened Uni-Piece Fibrous Insulation (TUFI) as disclosed in U.S. Pat. No. 5,079,082 issued Jan. 7, 1992 to Leiser et al. This material represented the first family of lightweight inexpensive graded thermal protection materials. The emittance agent was molybdenum disilicide. It included a borosilicate glass matrix and a processing aid (silicon hexaboride) that permitted sintering at 2225° F. (1220° C.). TUFI is used in selected areas on the Orbiter where the temperatures of operation are much lower than its capability of 2600° F. (1425° C.). The use of TUFI-like systems as a leading edge requires still higher temperature capability.

The specific disadvantages of the prior art depend upon the type of leading edge chosen. For a structural type leading edge, the major disadvantages are weight; the complexity of designing a hot structure that must perform under load and expand from room temperature to high temperature while maintaining structural integrity and while remaining attached to the vehicle; and the cost and time required to produce appropriate parts. For an insulating leading edge the disadvantage has been the relatively limited temperature capability of materials that has made it, under most circumstances, an impracticable choice due to the unacceptable limitations it imposes on the resultant atmospheric entry vehicles.

For the reasons stated above, and for other reasons stated below that will become apparent to those skilled in the art upon reading and understanding the present specification, there is a need in the art for alternative insulating structures.

SUMMARY

The various embodiments include high-efficiency tantalum-based ceramics. These low catalytic efficiency and high emittance ceramic materials were developed in order to increase the capability of a TUFI-like thermal protection system, with its high impact resistance, to temperatures above 3000° F. (1650° C.). These ceramics have been applied to both blunt and sharp wedge shaped configurations as well as the conventional shaped tile used on current high-speed atmospheric entry vehicles.

The tantalum-based ceramics contain tantalum disilicide, borosilicate glass and, optionally, molybdenum disilicide. The components are milled, along with a processing aid to facilitate sintering, then applied to a surface of a porous substrate, such as a fibrous or open pore foamed silica, carbon, aluminosilicate, silicon carbide or silicon oxycarbide substrate, as well as other substrates of silicon/carbon compositions. Following application, the coating is then sintered on the substrate. The composite structure is substantially impervious to hot gas penetration and capable of surviving high heat fluxes (temperatures approaching 3000° F. (1650° C.) and above).

For one embodiment, the invention provides a composite insulating structure. The structure includes a substrate and a coating adjoined to the substrate. The coating includes tantalum disilicide and borosilicate glass. For a further embodiment, the coating further includes molybdenum disilicide. For a still further embodiment, the coating further includes a processing aid, such as silicon hexaboride. For one embodiment, the coating impregnates the surface of the substrate. For a further embodiment, the coating impregnates the surface of the substrate to a depth of approximately 0.1 inches.

For another embodiment, the invention provides a composite insulating structure. The structure includes a porous substrate. The structure further includes a sub-layer applied to the porous substrate. The sub-layer includes molybdenum disilicide, silicon hexaboride and borosilicate glass. The sub-layer impregnates a surface of the substrate forming a functionally gradient layer transitioning from a material that is substantially the composition of the substrate to a material that is substantially the composition of the sub-layer. Density and properties gradually vary across this transition layer as a function of depth from the surface of the substrate. The structure further includes one or more second layers applied to the sub-layer. These second layers include tantalum disilicide, molybdenum disilicide, silicon hexaboride and borosilicate glass.

For yet another embodiment, the invention provides a composite insulating structure. The structure includes a porous substrate. The structure further includes a coating applied to the substrate. The coating includes tantalum disilicide, silicon hexaboride and borosilicate glass. For one embodiment, the coating impregnates a surface of the substrate.

The invention further includes composite insulating structures of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and chemical changes may be made without departing from the spirit and scope of the present invention. The following detailed description is, therefore, not to be taken in a limiting sense, and the scope of the present invention is defined only by the appended claims and equivalents thereof.

The various embodiments include insulating composites capable of surviving high heating rates and large thermal gradients in the aeroconvective heating environment that entry vehicles are exposed to characteristically. For one embodiment, the composites are formed of a ceramic coating overlying a substrate. For a further embodiment, the ceramic coating impregnates a surface of the substrate to form a functionally gradient composite structure. Such ceramic coatings can be applied to blunt and sharp wedge shaped configurations as well as the conventional shaped tile used on current high-speed atmospheric entry vehicles. Tailored formulations of this new family of tantalum silicide based materials make them compatible with a wide variety of different lightweight fibrous systems.

The ceramics of the various embodiments are formed from four primary parts. The first is tantalum disilicide ($TaSi_2$), which can act as either the emittance agent or the matrix itself depending upon the composition. The second is molybdenum disilicide ($MOSi_2$), which acts as a secondary emittance agent or as an oxygen getter within the finished composite. The third is a borosilicate glass ($B_2O_3 \cdot SiO_2$), which acts as a source for boron and an alternative matrix depending upon the composition. The fourth is silicon hexaboride ($SiB_6$), which acts as a processing aid. It is a minor constituent and generally ranges from about 1% to about 5% by weight of the total composition. As used herein, all composition percentages will be by weight unless otherwise noted.

Figure 1:
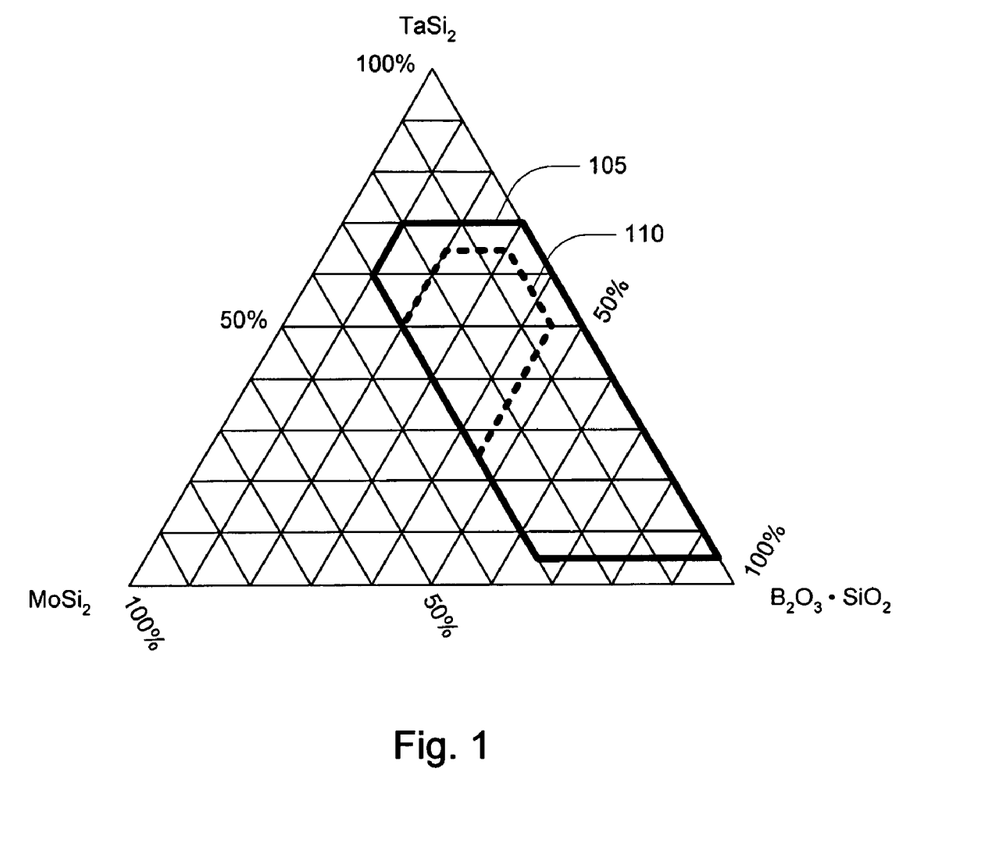
FIG. 1 is composition diagram of formulations in accordance with various embodiments of the invention.
Figure 2A:
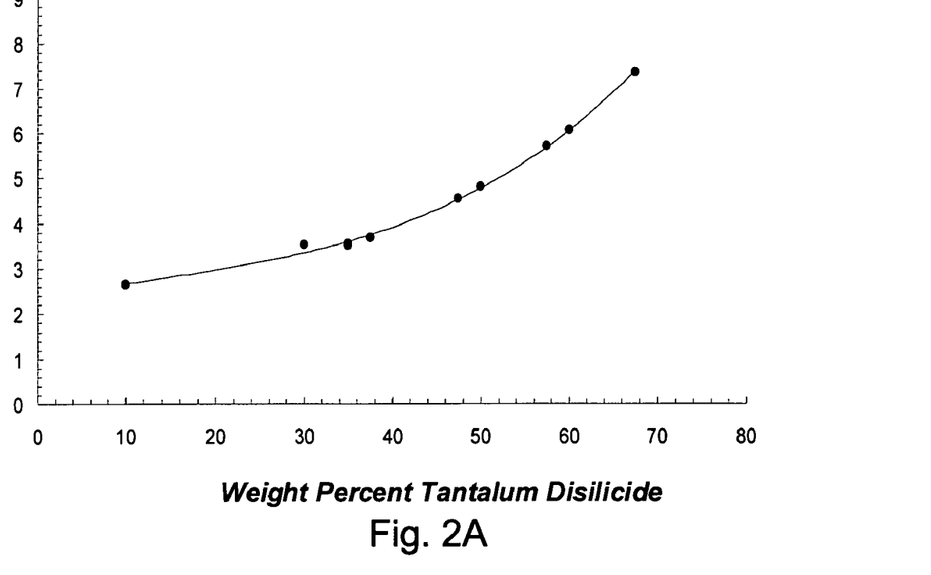
FIGS. 2A-2B are graphs of coefficients of thermal expansion typical for embodiments of the invention.
Figure 2B:
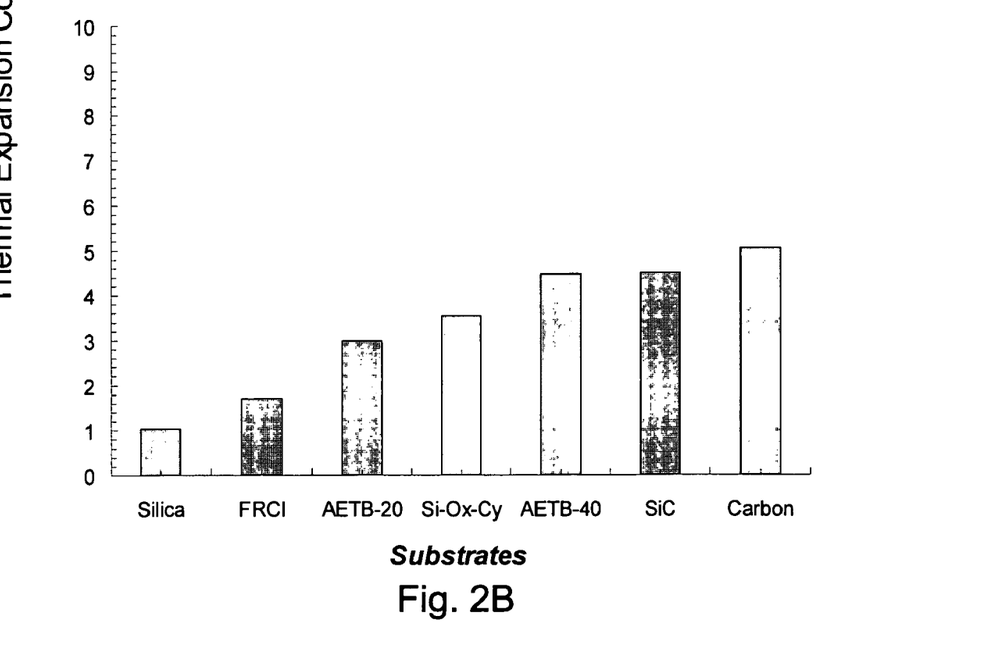

FIG. 1 shows a composition diagram excluding the silicon hexaboride processing aid and illustrates the wide range of formulations that have been demonstrated for the fabrication of outer layers of ceramic coatings of the various embodiments for use in aerospace applications. The boxed area 105 approximates the range of formulations demonstrated to be suitable for such aerospace applications having borosilicate glass compositions of approximately 10% to 95%, tantalum disilicide compositions of approximately 5% to 70%, and molybdenum disilicide compositions of approximately 0% to 30%. More preferably, the composition, excluding processing aids, includes approximately 20% to 45% borosilicate glass, 10% to 65% tantalum disilicide and 5% to 30% molybdenum disilicide. Underlying or sub-layers containing approximately 20% to 60% molybdenum disilicide, approximately 40% to 80% borosilicate glass and approximately 1% to 5% of a processing aid, e.g., silicon hexaboride, may be used to aid in the integration of outer or surface layers of ceramic coatings to the substrate. The sub-layers may impregnate a portion of the substrate to create a functionally gradient composite structure. The sub-layer preferably closely matches the coefficient of thermal expansion of the substrate while subsequent layers may be used to increase the density and CTE of the coating.

Formulations, with matching CTE have been integrated into oxide-based Alumina Enhanced Thermal Barrier (AETB) tiles and carbon preforms of various compositions and density. The formulations of the various embodiments were either painted or sprayed onto the selected preform before being sintered at either 2225° F. (1220° C.) for 90 minutes or 2400° F. (1315° C.) for 10 minutes in a furnace at atmospheric pressure. The high temperature fast sintering process along with the process for applying the treatment itself minimizes the oxidation of the tantalum disilicide acting as the major constituent within the majority of the ceramics produced. The molybdenum disilicide behaves like a secondary emittance agent or as an oxygen getter inhibiting the oxidation of the tantalum compounds present. The fabrication process results in a high viscosity quasi-amorphous structure that has high emittance in one instance and high emittance ceramic in the other.

Figure 3A:
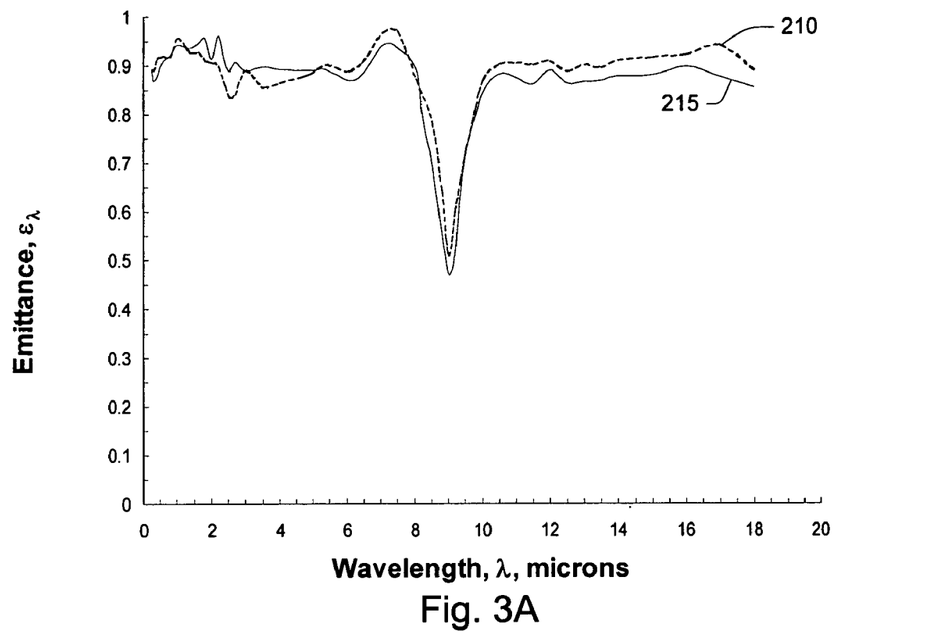
FIGS. 3A-3B are graphs of hemispherical emittance of a ceramic composite in accordance with an embodiment of the invention.
Figure 3B:
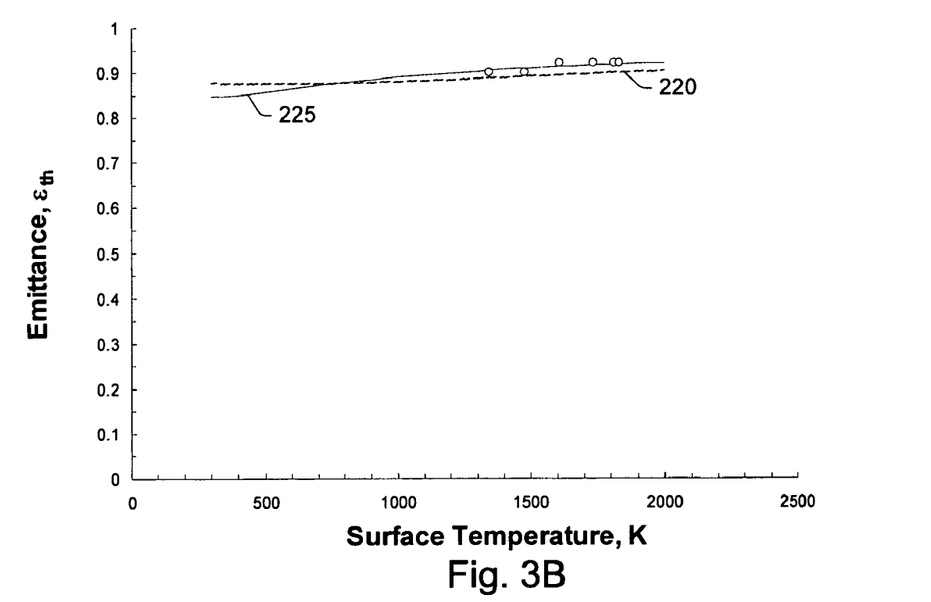

Compositions of the various embodiments have been applied to both simulated wing leading edge (WLE) and sharp wedge configurations in order to study the resulting thermal protection system (TPS) performance in high-energy arc jet flow. A blunt wedge (approximately 1.5 inch radius) made using AETB-40/12 with a coating containing a 35% tantalum disilicide/20% molybdenum disilicide formulation demonstrated reuse capability of a toughened fibrous ceramic (a functionally gradient composite) surface to heat fluxes up to 70 W/cm² in arc jet flow. FIG. 3A shows that the spectral hemispherical emittance of this formulation is relatively unchanged. Line 210 depicts the spectral hemispherical emittance prior to arc-jet exposure while line 215 depicts the spectral hemispherical emittance after arc jet exposure. FIG. 3B demonstrates that the total hemispherical emittance remains high, approximately 0.9 or above, after arc jet exposure to surface temperatures above 2800° F. (1540° C.) for 50 minutes. Line 220 depicts the total hemispherical emittance prior to arc jet exposure while line 225 depicts the total hemispherical emittance after arc-jet exposure.

In addition, an embodiment of the invention having 65% tantalum disilicide/15% molybdenum disilicide was successfully applied to a sharp leading edge configurations (wedge with approximately 0.06 inch radius). These test articles were made using silicon oxycarbide and carbon preforms. These test articles were tested for short exposures (1.0 minute) to heat fluxes in excess of 300 W/cm$^2$.

Figure 4A:
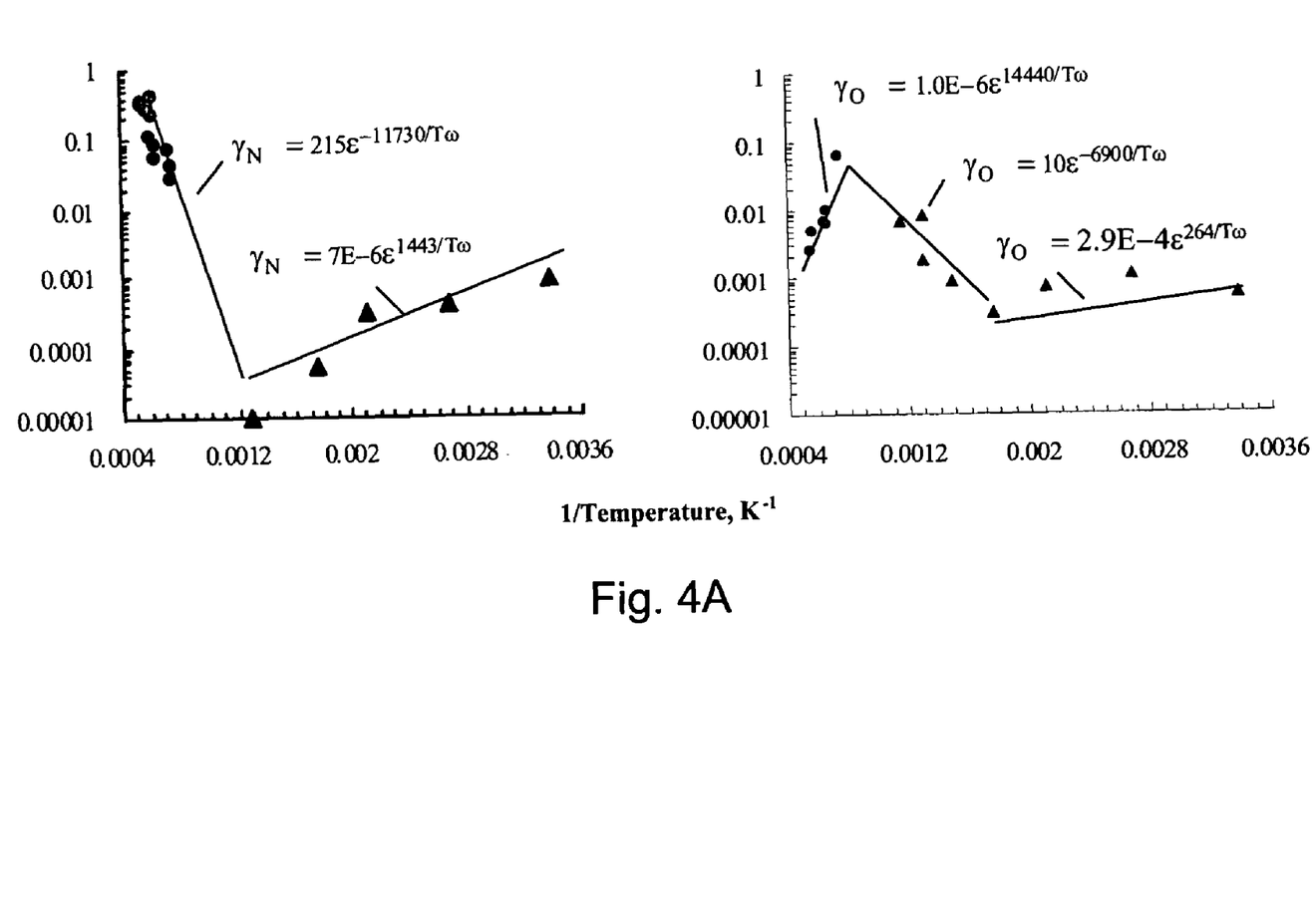
FIGS. 4A-4C are graphs comparing atom recombination coefficients for prior art materials (4A-4B) to ceramic composites in accordance with an embodiment of the invention (4C).
Figure 4B:
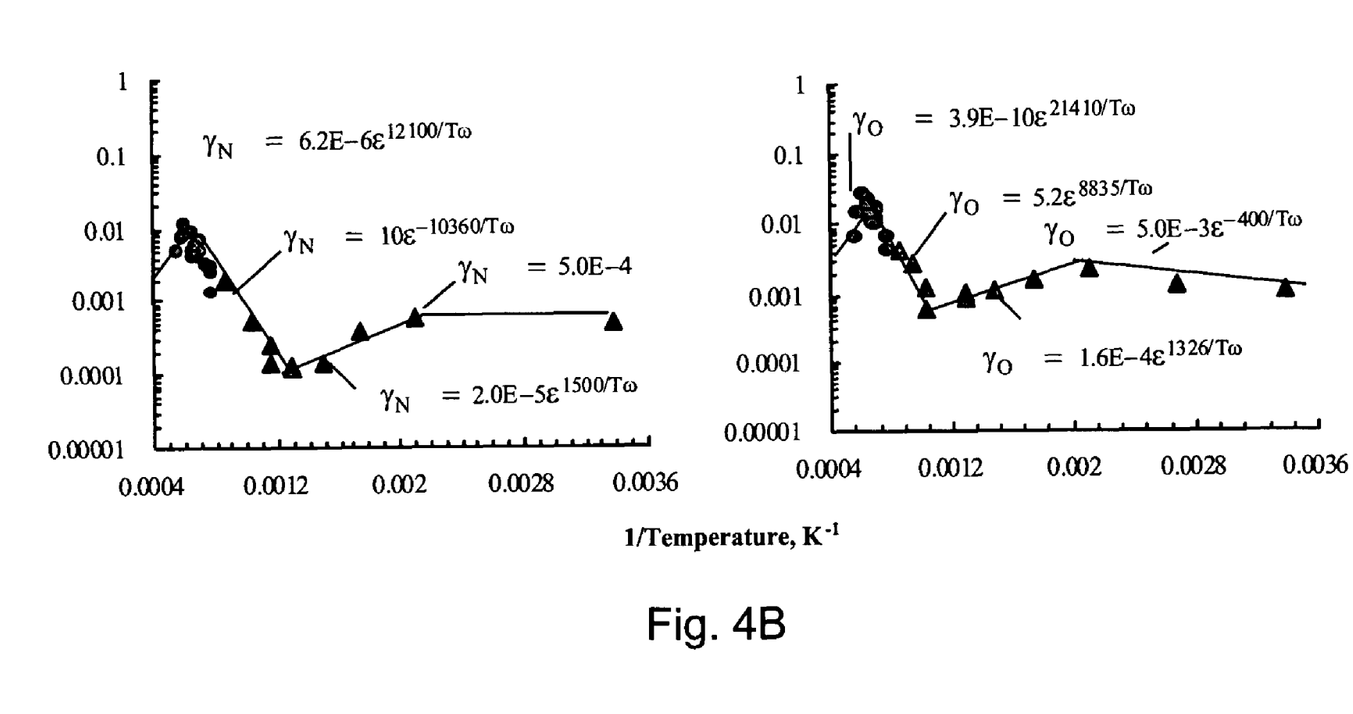
Figure 4C:
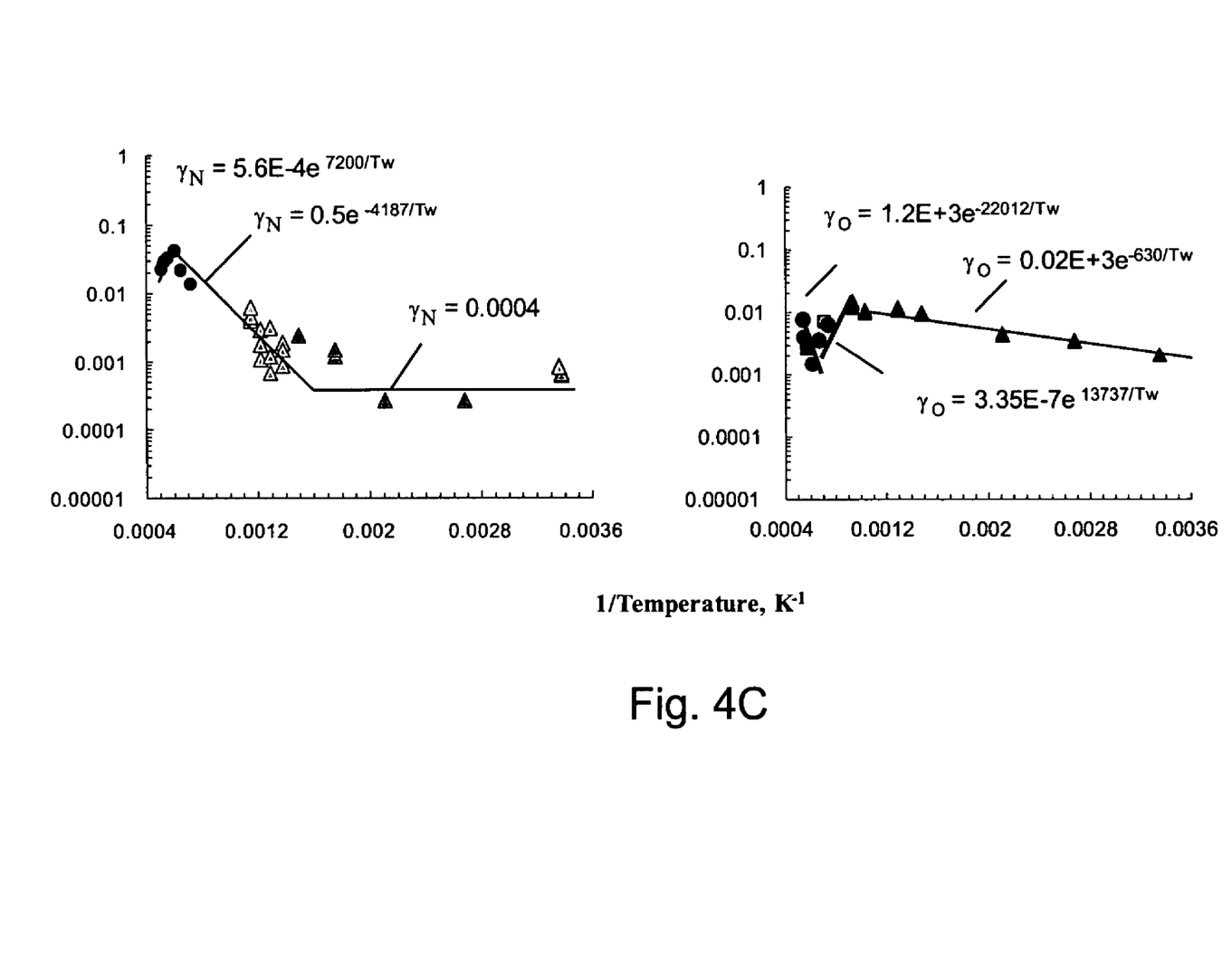

Another important characteristic of the ceramic composites of the various embodiments is illustrated with reference to FIGS. 4A-4C. FIGS. 4A-4C are graphs of atom recombination coefficients for oxygen and nitrogen. The coefficients have a direct effect on the heat transfer rate to a re-entry vehicle's TPS during high-energy hypersonic flight. The lower the value the less the heat transfer rate (lower surface temperature) to the surface of the TPS due to reduced chemical heating (atom recombination). FIG. 4A represents the recombination coefficients for an RCG surface. FIG. 4B represents the recombination coefficients for a TUFI surface. FIG. 4C represents the recombination coefficients for a ceramic composite in accordance with an embodiment of the invention. As can be seen, the values of the recombination coefficients for nitrogen ($\gamma_N$) and oxygen ($\gamma_O$) for ceramics in accordance with the invention are very comparable with those for an RCG system making the material extremely advantageous. The low recombination coefficient is also indicative of an amorphous or quasi-amorphous surface structure, similar to RCG. X-ray diffraction analyses of a 35% tantalum disilicide 20% molybdenum disilicide formulation indicated that the surface actually became more amorphous after arc jet exposure.

Figure 5:
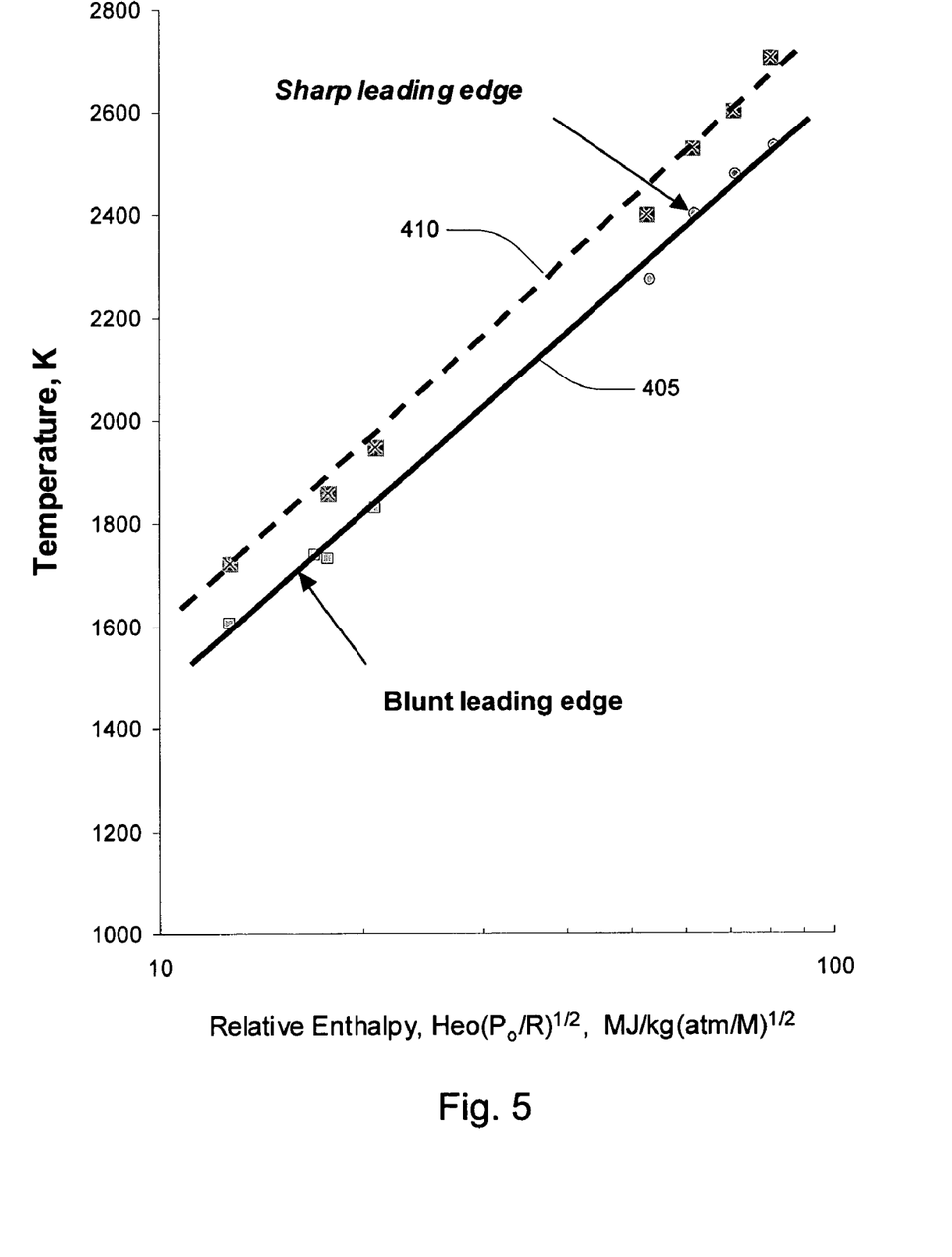
FIG. 5 is a graph of surface temperature versus relative enthalpy comparing a fully catalytic surface to a ceramic composite in accordance with an embodiment of the invention.

Use of ceramic compositions in accordance with the invention into a heat shield for a spacecraft (using either a fibrous and/or foamed substrate) can facilitate a reduction of the surface temperature during Earth entry of several hundred degrees below the values calculated assuming a fully catalytic wall. This is best illustrated in FIG. 5, which compares the measured surface temperature taken from a cone made using a ceramic composite in accordance with an embodiment of the invention, i.e., solid line 405, with predicted values for a similar cone assuming a fully catalytic wall, i.e., dashed line 410.

Figure 6A:
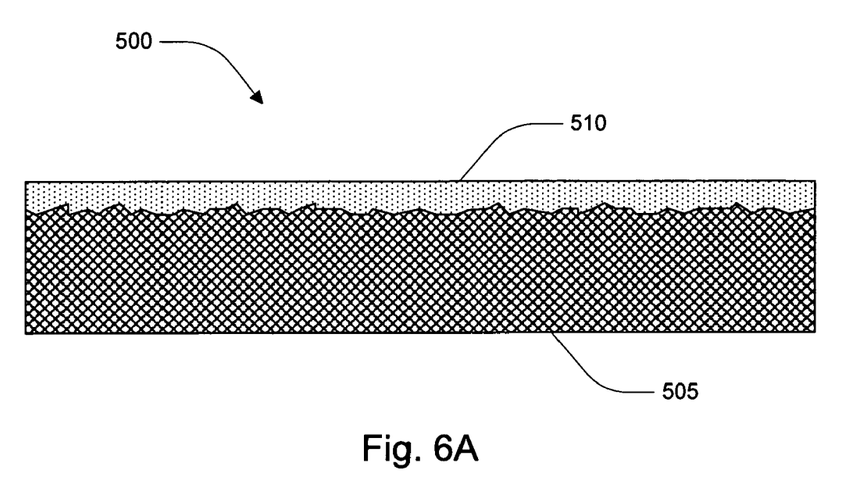
FIGS. 6A-6B are cross-sectional views of composite insulating structures in accordance with embodiments of the invention.
Figure 6B:
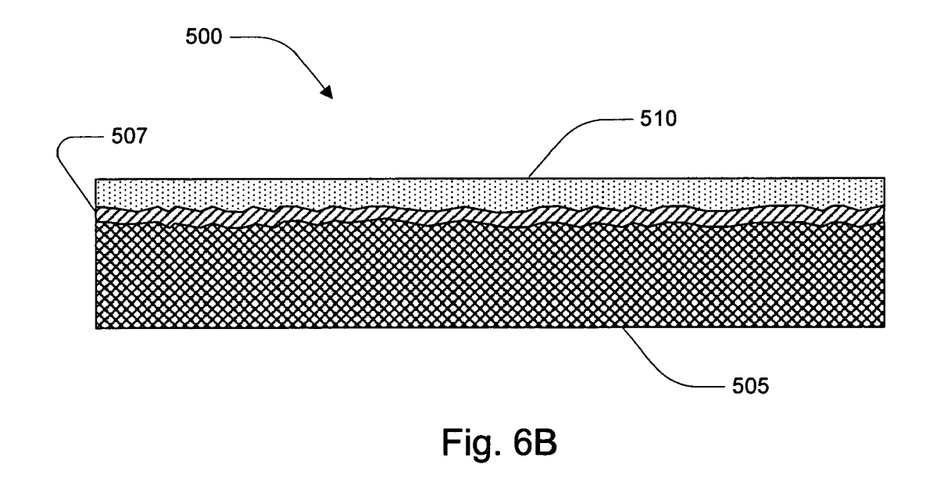

FIGS. 6A-6B are a cross-sectional views of composite insulating structures 500 in accordance with embodiments of the invention. While the structures 500 are depicted to have substantially planar surfaces, other forms are also suitable, such as rounds, blunt wedges, sharp wedges or more complex geometries. The structures 500 include a substrate 505 and a ceramic coating 510 overlying and adjoined to the substrate 505. In forming the coating 510, it is preferred that the particle size of the components be reduced to allow impregnation of a surface or outer portion of the substrate 505 during application of the coating material, thereby forming a transition layer 507 containing substrate 505 and ceramic coating 510 as shown in the embodiment of FIG. 6B. Each component of the coating 510, i.e., the $MoSi_2$, $TaSi_2$ and borosilicate glass, as well as processing aids that do not materially affect the basic and novel characteristics of the ceramic coatings described herein, may be ball-milled separately or together in ethanol at 20-30% solids by weight for a suitable time to reduce particle size.

For one embodiment, the desired particle size is less than about 5 μm. For a further embodiment, the desired particle size distribution has a maximum of less than about 5 μm and a mode of approximately 1 μm. After milling, the resultant slurries are combined, if necessary, to achieve a homogeneous dispersion. The dispersion may then be sprayed, painted or otherwise applied to a surface of the substrate 505. One or more applications may be performed to achieve a desired thickness. Alternatively, or in addition, individual applications may have the same composition, or the composition may be altered for one or more layers. For example, initial layers applied to the substrate 505 to form the transition layer 507 through impregnation may have a first composition while subsequent layers applied to the substrate 505 to form the outer surface of coating 510 overlying the substrate 505 may have a second composition.

For one embodiment, the amount of ceramic material used for coating 510 is adjusted to provide from approximately 0.07 to approximately 0.21 g/cm$^2$ of coating 510. For a further embodiment, the amount of ceramic material used for coating 510 is adjusted to provide approximately 0.14 g/cm$^2$ of coating 510. Suitable examples of the substrate 505 include silica, fibrous refractory composite insulation (FRCI), and AETB. Further examples include fibrous and/or foamed silicon carbide and silicon oxycarbide.

After application of the coating 510, the structure 500 can be dried overnight at room temperature or for about two to about five hours at temperatures up to about 70° C. After drying, the coating 510 is sintered at approximately 2225° F. (1220° C.) for 90 minutes or 2400° F. (1315° C.) for 10 minutes in a furnace at atmospheric pressure. The structure 500 is normally inserted into the furnace at temperature and cooled by rapid removal from the furnace. The final coating 510 appears flat black and is pervious to water penetration. For one embodiment, the composition of the coating 510 is adjusted such that its coefficient of thermal expansion after sintering substantially matches the coefficient of thermal expansion of the underlying substrate 505.

The following non-limiting examples describe the invention further and represent various example embodiments in which the invention may be practiced.

Example 1

For one embodiment, a composite insulating structure substantially impervious to hot gas penetration was prepared by mixing 35% tantalum disilicide with 20% molybdenum disilicide, 2.5% silicon hexaboride and 52.5% borosilicate glass. The borosilicate glass may contain from about 1% to about 10% boron oxide, but is preferably approximately 94.25% silicon dioxide and 5.75% boron oxide. All of the components were ball milled for 65 hours in an alcohol medium at 70% solids. FIG. 6 is a graph of the approximate particle size distribution measured after one such milling. After milling, the components were diluted to 25% solids prior to spraying on a substrate, e.g., AETB-40/12, with a sub-layer applied. The sub-layer was composed of 55% molybdenum disilicide, 2.5% silicon hexaboride and 42.5% borosilicate glass. All of the components of the sub-layer were ball milled for 65 hours in an alcohol medium at 70% solids and diluted to 25% solids prior to application. The sub-layer comprised 40% by weight of the total surface treatment. It was fired at 2225° F. (1220° C.) for 90 minutes and successfully tested at about 3000° F. (1650° C.) in a high-energy hypersonic arc jet flow.

Example 2

Figure 7:
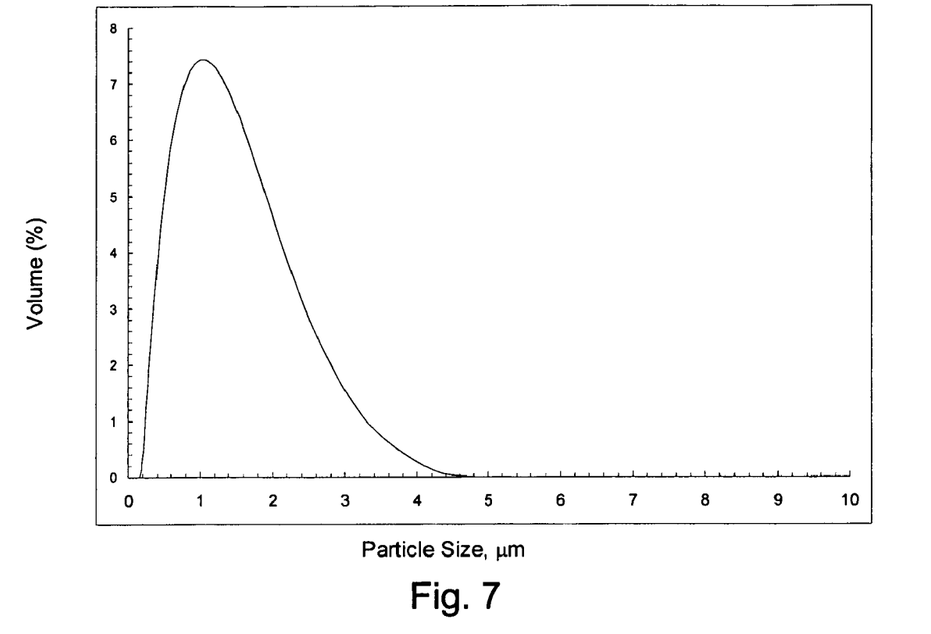
FIG. 7 is a graph of a particle size distribution of components for a ceramic composite in accordance with an embodiment of the invention.
Figure 8:
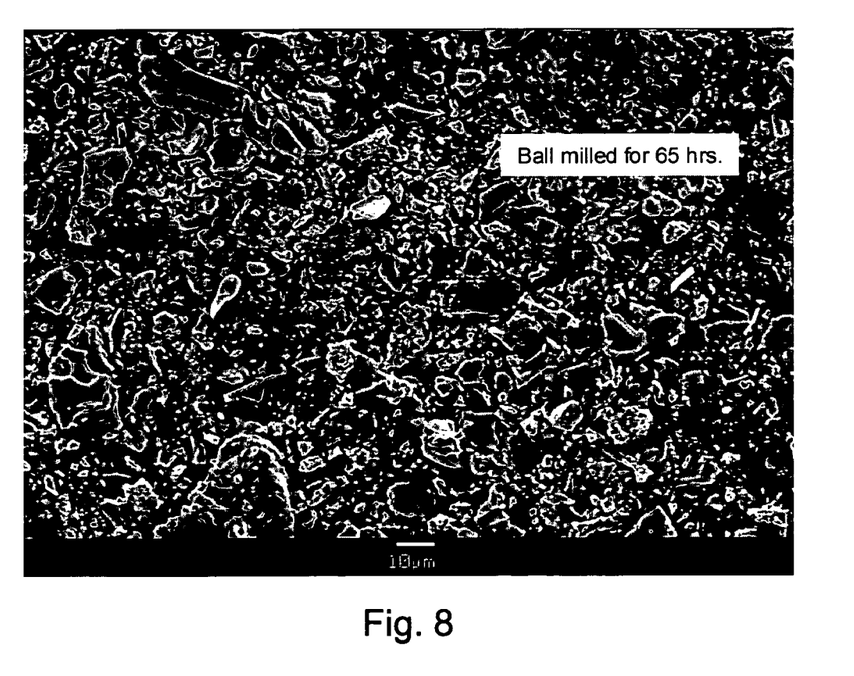
FIG. 8 is a photomicrograph showing the particulate nature of a ceramic composite in accordance with an embodiment of the invention after arc-jet exposure.

For another embodiment, a composite insulating structure substantially impervious to hot gas penetration was prepared by mixing 15% molybdenum disilicide with 60% tantalum disilicide, 2.5% silicon hexaboride and 22.5% borosilicate glass. All of the components were ball milled for 65 hours in an alcohol medium at 70% solids prior to spraying on a carbon preform with a sub-layer applied. The sub-layer was composed of 20% molybdenum disilicide, 2.5% silicon hexaboride and 77.5% borosilicate glass. All of the components of the sub-layer were ball milled for 65 hours in an alcohol medium at 70% solids and diluted to 25% solids prior to application. The sub-layer comprised 40% by weight of the total surface treatment. The structure was fired at 2400° F. (1315° C.) for 10 minutes and successfully tested at above 3800° F. (2095° C.) for one minute in a high-energy arc jet flow. FIG. 7 is a photomicrograph showing the particulate nature of the insulating structure after arc jet exposure.

Example 3

For yet another embodiment, a composite insulating structure substantially impervious to hot gas penetration was prepared by mixing 50% tantalum disilicide, 5% silicon hexaboride and 45% borosilicate glass. All of the components were ball milled for 65 hours in an alcohol medium at 70% solids prior to spraying on an AETB-40/12 substrate without a sub-layer applied. It was fired at 2225° F. (1220° C.) for 90 minutes and successfully tested at about 2900° F. (1595° C.) with observable foaming.

Example 4

For still another embodiment, a composite insulating structure substantially impervious to hot gas penetration was prepared by mixing 10% molybdenum disilicide with 45% tantalum disilicide, 2.5% silicon hexaboride and 42.5% borosilicate glass. All of the components were ball milled for 65 hours in an alcohol medium at 70% solids prior to spraying on an AETB-40/12 substrate with a sub-layer applied. The sub-layer was composed of 55% molybdenum disilicide and 2.5% by weight silicon hexaboride and 42.5% borosilicate glass. All of the components of the sub-layer were ball milled for 65 hours in an alcohol medium at 70% solids and diluted to 25% solids prior to application. The sub-layer comprised 40% by weight of the total surface treatment. The composite insulating structure was fired at 2400° F. (1315° C.) for 10 minutes and successfully tested in an arc jet stream at about 2830° F. (1555° C.) for 6 minutes.

Example 5

For another embodiment, a composite insulating structure substantially impervious to hot gas penetration was prepared by mixing 15% molybdenum disilicide with 40% tantalum disilicide, 2.5% silicon hexaboride and 42.5% borosilicate glass. All of the components were ball milled for 65 hours in an alcohol medium at 70% solids and diluted to 25% solids prior to spraying on an AETB-40/12 substrate with a sub-layer applied. The sub-layer was composed of 55% molybdenum disilicide, 2.5% silicon hexaboride and 42.5% borosilicate glass. All of the components of the sub-layer were ball milled for 65 hours in an alcohol medium at 70% solids and diluted to 25% solids prior to application. The sub-layer comprised 40% by weight of the total surface treatment. The composite insulating structure was fired at 2400° F. (1315° C.) for 10 minutes and successfully tested at about 2870° F. (1575° C.) for 5 minutes.

Example 6

For a further embodiment, a composite insulating structure substantially impervious to hot gas penetration was prepared by mixing 20% molybdenum disilicide with 50% tantalum disilicide, 2.5% silicon hexaboride and 27.5% borosilicate glass. All of the components were ball milled for 65 hours in an alcohol medium at 70% solids and diluted to 25% solids prior to spraying on a wedge-shaped carbon preform with a sub-layer applied. The sub-layer was composed of 20% molybdenum disilicide, 2.5% silicon hexaboride and 77.5% borosilicate glass. All of the components of the sub-layer were ball milled for 65 hours in an alcohol medium at 70% solids and diluted to 25% solids prior to application. The sub-layer comprised 40% by weight of the total surface treatment. The composite insulating wedge-shaped structure was fired at 2400° F. (1315° C.) for 10 minutes and successfully tested at around 3800° F. (2095° C.) for one minute in an arc-jet hypersonic stream.

Example 7

For yet a further embodiment, a composite insulating structure substantially impervious to hot gas penetration was prepared by mixing 30% molybdenum disilicide with 10% tantalum disilicide, 2.5% silicon hexaboride and 57.5% borosilicate glass. All the components were ball milled for 65 hours in an alcohol medium at 70% solids and diluted to 25% solids prior to spraying on an AETB-40/12 substrate (using 3 micron diameter Nextel fibers) without a sub-layer applied. The composite insulating structure was fired at 2225° F. (1220° C.) for 90 minutes and successfully tested at 2950° F. (1620° C.) for 10 minutes. Although suitable for use in aerospace applications, this composite exhibited higher catalytic efficiency (200° F./110° C. higher surface temperature) than other formulations during exposure to hypersonic arc jet flow.

Example 8

For another embodiment, a functionally gradient composite insulating structure substantially impervious to hot gas penetration was prepared by mixing 20% molybdenum disilicide with 50% tantalum disilicide, 2.5% silicon hexaboride and 27.5% borosilicate glass. All the components were ball milled for 65 hours in an alcohol medium at 70% solids and diluted to 25% solids prior to spraying on a silicon oxycarbide preform with a sub-layer applied. The sub-layer was composed of 55% molybdenum disilicide, 2.5% silicon hexaboride and 42.5% borosilicate glass. All of the components of the sub-layer were ball milled for 65 hours in an alcohol medium at 70% solids and diluted to 25% solids prior to application. The sub-layer comprised 40% by weight of the total surface treatment. The composite insulating structure was fired at 2400° F. (1315° C.) for 10 minutes and successfully tested at 2900° F. (1600° C.) for 20 minutes.

Example 9

For another embodiment, a functionally gradient composite insulating structure substantially impervious to hot gas penetration was prepared by mixing 25% molybdenum disilicide with 50% tantalum disilicide, 2.5% silicon hexaboride and 22.5% borosilicate glass. All the components were ball milled for 65 hours in an alcohol medium at 70% solids and diluted to 25% solids prior to spraying on an open pore foamed silicon carbide preform with a sub-layer applied. The sub-layer was composed of 55% molybdenum disilicide, 2.5% silicon hexaboride and 42.5% borosilicate glass. All of the components of the sub-layer were ball milled for 65 hours in an alcohol medium at 70% solids and diluted to 25% solids prior to application. The sub-layer comprised 40% by weight of the total surface treatment. The composite insulating structure was fired at 2400° F. (1315° C.) for 10 minutes and successfully tested at 3000° F. (1650° C.) in hypersonic arc jet flow for 2 minutes.

CONCLUSION

The various embodiments include high-efficiency tantalum-based ceramics. These ceramic materials were developed in order to increase the capability of a TUFI-like thermal protection system, with its high impact resistance, to temperatures above 3000° F. (1650° C.). These ceramics have been applied to various aerodynamic configurations, such as wedge, wing leading segment and conventional tile shapes used on current high-speed atmospheric entry vehicles.

In addition, this family of tantalum-based ceramics exhibits low catalytic efficiency to atom recombination during exposure to high-energy dissociated hypersonic flow. Its surface catalytic efficiency is below that of standard TUFI and is equivalent to or lower than the reaction cured glass (RCG) presently used on the Orbiter.

These high-emittance ceramic formulations extend the performance envelope of fibrous insulations to surface temperatures above 3000° F. (1650° C.) for an extended period of time in an aeroconvective heating environment. For example, after five 10-minute exposures at a stagnation point heat flux of 70 W/cm$^2$, a 35% TaSi$_2$/20% MoSi$_2$ formulation applied to AETB-40/12 resulted in a surface recession of less than 0.05 inch. With standard surface treatments or coatings, damage to the AETB substrate occurred at these temperatures.

These unique structures have been successfully tested in arc jet flow after they were applied to both light-weight fibrous and foamed aluminosilicate and carbonaceous substructures. Thermal protection systems made using these high-emittance ceramic formulations result in leading edge components for space vehicles that are light weight, low cost, and perform at high-efficiency during hypersonic Earth atmospheric entry. The various embodiments facilitate composite insulating structures 10 to 50 times lighter than the current hot structures being used on the Orbiter and proposed for other reentry vehicles such as X-33, X-38, etc. In addition, the various embodiments facilitate composite insulating structures that are cheaper to fabricate and maintain, and easier to design, than corresponding existing structures providing similar thermal protection.

Aside from their applicability for use with atmospheric reentry vehicles, thermal protection systems in accordance with the invention are adapted for use with standard aircraft, turbine engines, race cars, automobiles and other applications that require thermal protection surfaces that are resistant to erosion and/or impact damage. The various embodiments further may find use as heating elements for furnaces requiring higher temperature capability than the standard molybdenum disilicide type heating elements.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A composite structure, comprising:
   a porous substrate, having a lower surface and an upper surface and comprising a selected substrate material and having a substrate coefficient of thermal expansion;
   a first layer integrated with an exposed surface of the substrate, wherein the first layer material comprises between 20 percent and 60 percent molybdenum disilicide, between 40 percent and 80 percent borosilicate glass and a processing aid, with the first layer being positioned adjacent to and between the substrate upper surface and a second layer having a material composition different from the first layer;
   wherein the second layer material comprises between 5 percent and 70 percent tantalum disilicide, between 5 percent and 30 percent molybdenum disilicide, and between 10 percent and 95 percent borosilicate glass;
   wherein a composition of the first layer is chosen so that a coefficient of thermal expansion of the first layer is approximately the same as the coefficient of thermal expansion of the substrate; and
   wherein the combined first and second layers provide a protective layer when exposed to temperatures around 3000° F.

2. The composite structure of claim 1, wherein said processing aid comprises silicon hexaboride.

3. The composite structure of claim 1, wherein said first layer material impregnates said substrate to a depth of approximately 0.1 inches.

4. The composite structure of claim 1, wherein said substrate material is selected from the group consisting of a fibrous and open pore silica, silicon carbide, aluminosilicate, silicon oxycarbide and carbon substrates.

5. The composite structure of claim 1, wherein at least one component of said second layer has a particle size less than about 5 μm.

6. The composite structure of claim 1, wherein at least one component of said second layer has a particle size distribution having a maximum of approximately 5 μm and a mode of approximately 1 μm.

* * * * *